Patented Jan. 15, 1952

2,582,568

UNITED STATES PATENT OFFICE 2,582,568

SILICON-CONTAINING ESTERS

John Leopold Speier, Pittsburgh, Pa., assignor to Dow Corning Corporation, Midland, Mich., a corporation of Michigan No Drawing. Application July 2, 1948, Serial No. 36,811. In Great Britain August 26, 1947

2 Claims. (Cl. 260—448.2)

The present invention relates to the production of organic esters which are substituted with an organosilyl radical in the alpha position of a primary alcohol.

The chemistry of the organosilicon compounds has been to a large extent, for many years past, a thing apart from organic chemistry. In the previous work on the organosilicon compounds, the major development has been in silanes and siloxanes, substituted with hydrocarbon radicals on the silicon, and in which the functional bonds were between the silicon and atoms linked directly thereto. The fact that the primary functionality of these materials was directly associated with the silicon resulted in the major development work centering around hydrolyzable silanes and around variations in the geometry of the skeleton of the siloxane molecules derived by hydrolysis thereof. These materials were free of functionality other than that inherent in siloxane bonds.

Objects of the present invention are to provide methods for the production of organosilicon compositions which contain functional linkages in radicals linked to the silicon by carbon to silicon linkage. This functional linkage in the radical which is linked to the silicon results in the compound partaking to a major extent of the characteristics of organic compounds other than paraffins. Further objects are the provision of methods for the production of compositions of the type indicated.

In accordance with the present invention, esters are prepared which contain a hydrocarbonylsilyl radical in the alpha position of a primary alcohol by interacting a silane of the type formula $R_nCl_mSi(CH_2Cl)_{4-n-m}$ with a metal salt of a carboxylic acid, in the presence of a solvent for this salt. Preferably the free carboxylic acid or its anhydride is employed as solvent. In the formula stated, R represents hydrocarbonyl radicals, and m and n represent integers from 0 to 3, the sum of m and n being less than four.

The compounds of this type may be prepared in a variety of ways. Various chloro(chloromethyl)methylsilanes have been described in the literature. The compound chloromethyltrimethylsilane may be prepared if desired, by the chlorination of tetramethylsilane. It may likewise be prepared by reacting chloromethyl dimethyl silicon chloride with a methyl Grignard reagent. Other materials of this type may be prepared by reacting chloromethyl silicon trichloride (described in the literature) with any desired Grignard reagent to bond three hydrocarbon radicals to each silicon, though in some instances the yields are limited due to side reactions. Likewise the compound $(ClCH_2)_2CH_3SiCl$ may be reacted with any desired Grignard reagent, whereby to substitute any desired organic radical for the chlorine on the silicon.

The hydrocarbon radicals in each of these types of compounds are preferably aryl such as phenyl, or alkyl such as methyl or higher alkyl, for example, octadecyl.

This type of material is reacted with a metal salt of carboxylic acid in the presence of the carboxylic acid in the free state. Thus, the carboxylic acid, as is known in organic chemistry in the general type of reaction with which the present invention deals may be of widely divergent character. The dicarboxylic acids and the aromatic carboxylic acids may be employed if desired, though it is preferred to employ mono-carboxylic aliphatic acids. The reaction is obtained in the presence of the carboxylic acid in the free state, the salt of which is employed. A metal salt of the acid is employed. The metal as is known in the chemistry of this type of reaction is one, the chloride of which is insoluble in the acid. Thus, the alkali metals, the alkali earth metals, and silver are suitable for this purpose.

The reaction involved in the process of the present invention appears to proceed in varying rates depending upon the temperature. At room temperature the reaction would appear to proceed but at a rate too low for commercial operation. It is therefore desirable in general to heat the reaction mixture to above 100° C. The temperature in all events should be above the melting point of the carboxylic acid which is employed inasmuch as the carboxylic acid functions as solvent for the system. During the course of the reaction the metal chloride is formed and precipitated. Following formation of a substantial amount of the metal chloride, the reaction mixture is washed with water to remove the metal chloride together with any residual carboxylic acid salt and carboxylic acid. In case of carboxylic acids which are insoluble in water these may be removed by neutralizing and washing the reaction mixture with dilute alkali metal hydroxide solution. In the case of water insoluble metal salts, such as silver chloride, the salt may be removed by filtration.

Pressure is not essential to the present reaction. The role of pressure in the present process is to maintain any low boiling chloromethyl substituted silane in the reaction mixture. Thus, in the case of trimethyl chloromethylsilane temperatures upwards of 120° C. are desirable. In order to obtain these temperatures it is necessary to run the reaction mixture at superatmospheric pressure. In some instances, as for example, when acetic acid or benzoic acid is used, pressure is necessary in order to employ elevated temperatures.

The esters of primary organic alcohols of the type produced in accordance herewith are of principal utility as intermediates for the production of a wide range of organic materials containing silicon in the molecule, which materials have not heretofore been produced. Thus, one of the interesting and extremely important materials which can be produced from these esters is trimethylsilyl methanol, which is produced by hydrolysis or alcoholysis of the corresponding ester. This alcohol is an antiseptic which has proven to be very effective against a wide range of bacteria and which is also substantially non-irritating either to human skin or mucous membrane.

When silanes of the type indicated in which all of the valences of the silicon are satisfied by carbon are reacted in accordance herewith acetoxymethyl silanes are produced. When the silane which is reacted has one or more chlorine atoms directly bonded to the silicon, the silicon bonded chlorine atoms are cleaved with the formation of siloxane bonds and the chloromethyl substituents are converted to acetoxymethyl substituents whereby there are produced acetoxymethyl siloxanes.

Products in accordance herewith are of the formula $R_nSi(CH_2OOCCH_3)_{4-n}$ in which R represents hydrocarbon radicals as above indicated and $n$ is an integer from 0 to 3 inclusive. Preferably $n$ is an integer from 1 to 3 inclusive. Two particularly desirable products in accordance herewith are the compounds $(CH_3)_2Si(CH_2OOCCH_3)_2$ and $(CH_3)_3SiCH_2OOCCH_3$.

EXAMPLES

Example 1

210 parts by weight of anhydrous potassium acetate were dissolved in 420 parts of glacial acetic acid. The mixture was warmed and 244 parts of trimethyl chloromethyl silane were added. The mixture was heated under reflux for 16 hours. Some salt had been precipitated at this temperature. The mixture was then placed in a bomb and heated at 192° C. for 17.5 hours. The bomb was cooled and the contents were discharged. Potassium chloride had been formed and was present as gritty fine crystals. The mixture was washed with water until free of acids. 249.5 parts of product were obtained which product was distilled. A large plateau was obtained at 136.2° C. under 748.2 mm. pressure. This product which was obtained in yield of over 92% of theoretical was proven to be $$(CH_3)_3SiCH_2OOCCH_3$$

This material had an index of refraction at 25° C. of 1.4060, a specific gravity of 0.8867, a molar refraction of 41.37 and a saponification equivalent of 146.5. Analysis showed the compound to contain 19.2 per cent Si.

Example 2

290 parts by weight of bis-chloromethyl dimethyl silane, 412 parts of anhydrous potassium acetate and 312 parts of glacial acetic acid were charged into a pressure autoclave. The autoclave was shaken for 4 hours at 118° to 130° C. and for 16 hours at 148° to 160° C. The contents of the autoclave were washed with water to remove salts and acid. Upon distillation a yield of 338.5 parts of product were obtained representing a yield equal to 90% of theory. This product was bis-acetoxymethyldimethylsilane $$(CH_3)_2Si(CH_2OOCCH_3)_2$$

This product had a boiling point of 124° C. at 27 mm., an index of refraction at 25° C. of 1.4309 to 1.4310, a specific gravity at 25° C. of 1.1035 and a molar refraction of 52.17. The saponification equivalent of the product was found to be 102.

Example 3

Dichloro(chloromethyl)methylsilane, in amount of 297 grams, was added to 588 grams of potassium acetate in acetic acid solution. The mixture was heated under reflux for 16 hours. The product so obtained was distilled whereby acetic anhydride was removed therefrom. The product was washed with water to remove residual acid and salts. A high polymer was thereby produced which had the formula $(CH_3COOCH_2SiCH_3O)_n$. When this polymer was heated, exposed to air for 62 hours at 150° C., there was observed no loss of weight therefrom. The polymer had an index of refraction at 25° C. of 1.4428 and a viscosity at 25° C. of 136.7 centistokes and at 3.3° C. of 403 centistokes.

That which is claimed is:

1. Compounds of the general formula $$R_2Si(CH_2OOCCH_3)_2$$

in which R represents hydrocarbon radicals of the group consisting of alkyl and monocyclicaryl radicals.

2. $(CH_3)_2Si(CH_2OOCCH_3)_2$.

JOHN LEOPOLD SPEIER.

REFERENCES CITED

The following references are of record in the file of this patent:

Whitmore et al.: "Jour. Am. Chem. Soc.," vol. 68 (1946), pages 481–484.

Speier et al.: "Jour. Am. Chem. Soc.," vol. 70 (1948), pages 1117–1119.